Oct. 17, 1950          J. G. INGRES          2,526,236
LEAKAGE RECOVERING DEVICE FOR HYDRAULIC
BOOSTER BRAKE MECHANISM
Filed Jan. 27, 1949
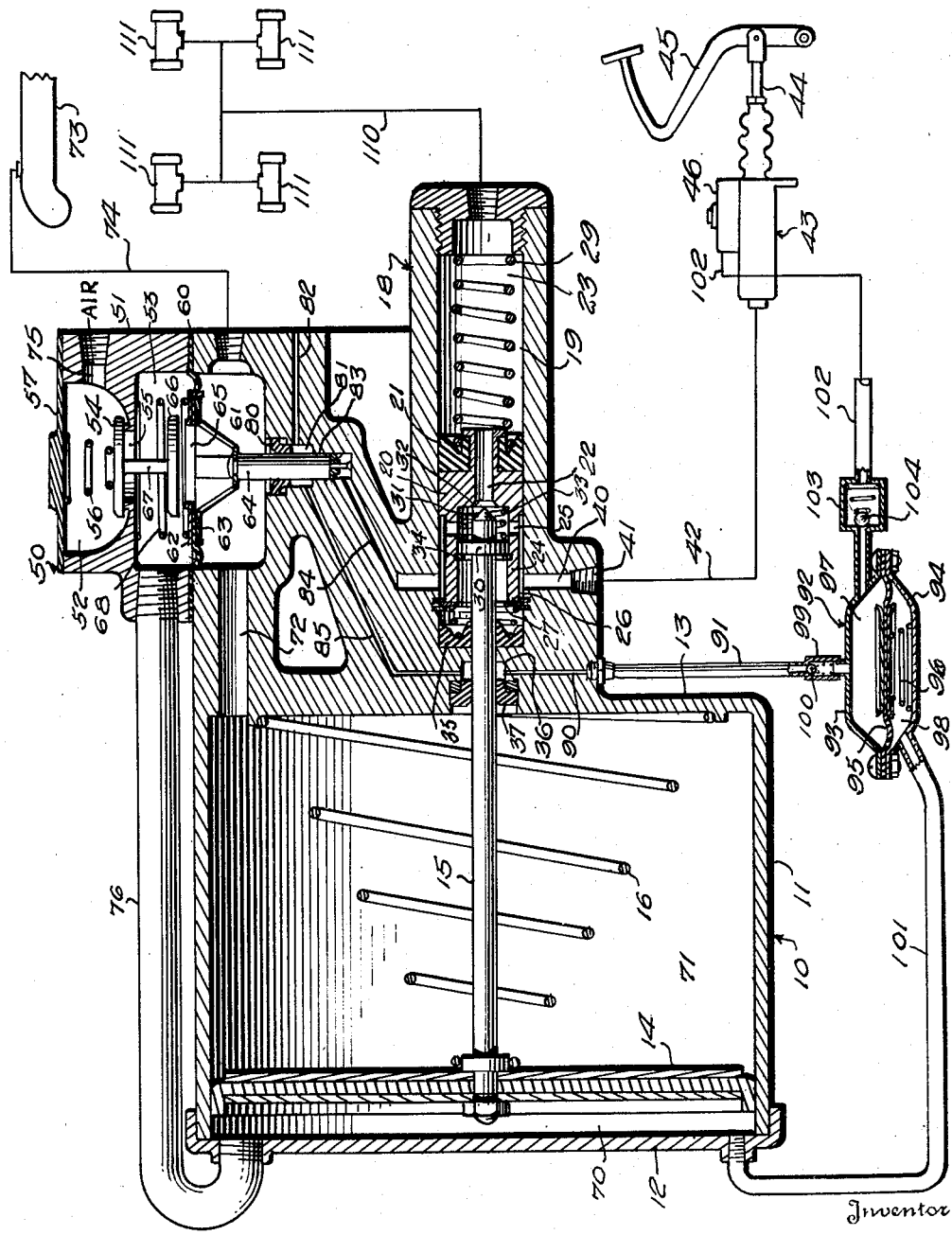
Inventor
JEANNOT G. INGRES
By Parker and Walsh
Attorneys Patented Oct. 17, 1950

2,526,236

UNITED STATES PATENT OFFICE 2,526,236

LEAKAGE RECOVERING DEVICE FOR HYDRAULIC BOOSTER BRAKE MECHANISM

Jeannot G. Ingres, Richmond, Va., assignor to Automatic Shifters, Inc., Richmond, Va., a corporation of Virginia Application January 27, 1949, Serial No. 73,174

14 Claims. (Cl. 60—54.5)

This invention relates to a leakage recovering mechanism for hydraulic booster brake mechanisms, and particularly relates to a mechanism for collecting brake fluid leaking from the pressure cylinder of a booster brake mechanism for motor vehicles and returning such leakage fluid to the reservoir of the master cylinder.

Commercially practicable vacuum-operated booster brake mechanisms are in general use on motor vehicles, and particularly heavy vehicles such as buses, trucks, and tractor-trailer combinations. So far as operating practicability is concerned, such mechanisms are wholly practicable and advantageous in assisting in the application of the vehicle brakes. Pressure is generated in a high pressure cylinder in an apparatus of this character by means of a piston or pistons operating to displace fluid from the high pressure cylinder into the brake lines, and then operating to build up static pressure to the desired extent for brake application, under the control of the operator.

Efficient control mechanisms for an apparatus of this character have been developed so that brake application can be effected to a degree proportional to the degree of force applied to the brake pedal. In practical operation, these mechanisms have one serious fault. Regardless of the great efforts which have been made to improve sealing cups associated with the high pressure pistons of booster mechanisms, a certain amount of leakage occurs from the high pressure cylinders. The fluid thus leaking from the system ultimately finds its way into the intake manifold of the vehicle engine, where the system is vacuum-operated, and is burned and expelled from the exhaust pipe. As a result, there is a slow but constant loss of brake fluid from the system and serious accidents have occurred through such loss of brake fluid. Systems of the character referred to function to automatically replenish from the vehicle master cylinder all the fluid which has leaked from the system, but where fluid is permanently lost in the manner referred to, the reservoir of the master cylinder is emptied in much less than the time which otherwise would be required. Without warning, therefore, the operator may depress the brake pedal only to find that he has no braking action available due to the loss of fluid from the system.

In the co-pending application of Edward G. Hill and Jeannot G. Ingres, Serial No. 11,056, filed February 26, 1948, there is disclosed and claimed a system for recovering and returning to the master cylinder all liquid which leaks past the high pressure piston of the booster mechanism. While not limited to such use, the prior mechanism is particularly intended for use with booster brake mechanisms of the type employing a low pressure piston operable in a low pressure cylinder by the displacement of brake fluid from the master cylinder, and a high pressure cylinder having, in effect, two pistons operable therein, one being actuated by the low pressure piston and the other by the booster motor. In the prior system referred to, leakage past the high pressure piston is withdrawn from the high pressure cylinder by partial vacuum created in one end of the low pressure cylinder, and the leakage fluid thus withdrawn is pumped back to the reservoir of the master cylinder by the pumping action of the low pressure system upon the next brake application.

The present invention has for its principal object the provision of a leakage recovering mechanism for booster brake apparatus particularly intended for use in those types of apparatus which do not employ a low pressure piston for withdrawing leakage fluid, and for pumping such fluid back to the master cylinder reservoir.

More specifically, an important object of the present invention is to provide an automatic pump specifically for the purpose of returning leakage fluid to the master cylinder reservoir and wherein such pump is automatically operated in accordance with the operation of the booster brake mechanism.

A further object is to provide a system of the character referred to wherein the pressure responsive unit of the pump is biased for movement in one direction and is movable in the opposite direction automatically in response to a function of the booster mechanism, and to utilize such two movements of the pressure responsive unit of the pump for withdrawing leakage fluid from the booster mechanism and returning it to the reservoir.

A further object is to provide such an apparatus particularly intended for use in that type of booster brake mechanism which embodies a valve-operating plunger responsive to displacement of fluid from the master cylinder for operating the booster motor, and wherein the present system minimizes leakage past the valve-operating plunger and returns to the reservoir any fluid which leaks around either the valve-operating plunger or around the piston rod.

Other objects and advantages of the invention will become apparent during the course of the following description.

In the drawing, I have shown one embodiment of the invention. In this showing,

The figure is a central longitudinal sectional view through a booster brake mechanism showing the invention applied, the master cylinder and its brake pedal, the brake cylinders, intake manifold and certain of the fluid lines being diagrammatically represented and parts being shown in elevation.

Referring to the drawing, the numeral 10 designates the booster motor as a whole comprising a cylinder 11 having heads 12 and 13 which may be conventional in construction. A piston 14 is reciprocable in the cylinder 11 and is provided with a piston rod 15 further described below. A spring 16 urges the piston 14 toward the left as viewed in the drawing, thus tending to hold the piston in its normal or off-brake position.

The head 13 is shown as having an integral axial projection indicated as a whole by the numeral 18, a portion of which forms a cylinder 19 in which is arranged a piston 20 carrying a sealing cup 21. The piston 20 is provided with an axial passage 22 therethrough in open communication at one end with the high pressure end 23 of the cylinder 19. The piston 20 is provided at one end with a cylindrical projection 24 having radial ports 25 communicating between the interior of the projection 24 and the low pressure end 26 of the cylinder 19. The cylindrical extension 24 normally contacts a snap ring 27, referred to below. A return spring 29 urges the piston 20 to "off" position.

The piston rod 15 engages a plunger 30 operable in the cylindrical projection 24, and the plunger 30 is provided with a conical valve 31 engageable with the conical seat 32 formed at the adjacent end of the passage 32. A spring 33 urges the piston 20 and plunger 30 apart, and in its "off" position, the plunger 30 contacts with a snap ring 34 carried by the extension 24.

The low pressure end 26 of the cylinder 19 is provided with a seal 35 through which the piston rod 15 extends, and this seal is intended to prevent leakage of fluid past the piston rod 15 into a small chamber 36, provided with a seal 37 through which the piston rod 15 extends. The seal 35 is seated by a spring 38 engaging the snap ring 27.

A passage 40 is drilled into the extended portion 18 of the head 13 and extends beyond the cylinder 19 at diametrically opposite sides thereof. At its outer end, that is the lower end as viewed in the drawing, the passage 40 is tapped as at 41 for connection by suitable means (not shown) to a pipe line 42 leading to the vehicle master cylinder indicated as a whole by the numeral 43. This master cylinder is conventional and need not be illustrated in detail, it being understood that the master cylinder employs the usual piston (not shown) operable by a rod 44 connected to a conventional brake pedal 45. The master cylinder is further provided with a conventional reservoir 46 which supplies replenishing liquid to the master cylinder, as necessary, in accordance with conventional practice.

Referring to the drawing, it will be noted that the booster motor is controlled by a suitable valve mechanism indicated as a whole by the numeral 50. This mechanism comprises a valve housing 51 having a pair of chambers 52 and 53. Communication between these chambers is controlled by a valve 54 adapted to seat on the top of a port 55. The valve 54 is urged downwardly by a spring 56, the upper end of which engages a cap 57 suitably secured to the top of the valve housing.

The bottom of the valve housing and the top of the adjacent portion of the head extension 18 are suitably fixed to each other on opposite sides of a flexible diaphragm 60 which divides the chamber 53 from a lower chamber 61. The diaphragm 60 is secured between an upper plate 62 and a lower cage 63, the latter of which carries a depending stem or plunger 64, further referred to below. The plate 62 is apertured as at 65 to afford communication between the chambers 53 and 61 under the control of a valve 66 fixed to the valve 54 by a stem 67. The valves 54 and 66 normally occupy the positions shown in the drawing and the closing of the valve 66 and the opening of the valve 54 are determined by the vertical movement of the diaphragm 60 in a manner to be described. The diaphragm 60 is urged downwardly by a compression spring 68 engaging the plate 62, thus tending to hold the diaphragm in its lower position as shown.

The piston 14 divides the booster motor cylinder 11 to form a variable pressure chamber 70 and a constant pressure chamber 71. The latter chamber is in constant communication with the chamber 61 through a passage 72, and the chamber 61, in turn, is in constant communication with the intake manifold 73 of the vehicle engine through a suitable pipe line 74. The chamber 52 is in constant communication with the atmosphere through a port 75, preferably provided with a conventional air cleaner (not shown). The chamber 53 is in constant communication with the variable pressure chamber 70 through a pipe 76. With the arrangement shown, vacuum is always present in the motor chamber 71, and when the parts are in the normal or off-brake positions shown, the pipe 76 and chamber 53 are also in communication with the vacuum chamber 61. Accordingly, the piston 14 will be vacuum-suspended in accordance with conventional practice.

The plunger 64 is sealed with respect to the chamber 61 by a cup 80, and beneath this cup is arranged a small chamber 81 surrounding the plunger 64. This chamber is in constant communication with the atmosphere by a bleed port 82, as shown. The lower end of the plunger 64 is reciprocable in a small cylinder 83, the lower end of which communicates through a passage 84 with the passage 40. The small chamber 81 is in constant communication with the chamber 36 through a passage 85.

Leakage fluid will flow in a manner to be described to a small chamber 36 through the passage 85, and from the chamber 36, such leakage fluid will flow through a passage 90 to a take-off pipe 91. Such leakage fluid is thus supplied to a return pump indicated as a whole by the numeral 92. This pump conveniently may be of the diaphragm type illustrated and comprises upper and lower casings 93 and 94 between which is clamped a diaphragm 95 preferably urged upwardly by a spring 96. The diaphragm 95 divides the pump into chambers 97 and 98. The chamber 97 is coupled to the pipe 91 as at 99, and an upwardly biased check valve 100 normally closes communication between the pipe 91 and chamber 97.

The chamber 98 communicates with the variable pressure chamber 70 through a pipe 101. It will be apparent that when vacuum is present in the motor chamber 70, the diaphragm 95 will be moved downwardly by atmospheric pressure in the chamber 97. When pressure is raised in the motor chamber 70, the spring 96 will move the diaphragm 95 upwardly. Downward movement of the diaphragm 95 draws leakage fluid into the chamber 97 from pipe 91, while upward movement of the diaphragm 95 displaces such leakage fluid from the chamber 95 to return the fluid to the reservoir 46. For this purpose, a pipe line 102 leads from the chamber 97 to the reservoir 46. A valve housing 103 is interposed in the pipe line 102, and a spring-biased check valve 104 in the housing 103 closes toward the chamber 97.

The generation of hydraulic pressure in the high pressure chamber 23 applies the vehicle brakes in the conventional manner. This chamber communicates through suitable pipe lines 110 with the brake cylinders 111, shown in the present instance as being four in number corresponding to the brake cylinders of a four-wheeled vehicle. Obviously, the number of brake cylinders employed will depend on the type of vehicle with which the apparatus is used.

*Operation*

The parts normally occupy the positions shown, as previously stated. The chamber 52 is constantly communicating with the atmosphere and is normally closed to the chamber 53 and the latter chamber is normally open to the chamber 61. The chamber 61 being in constant communication with the source of vacuum, namely the intake manifold 73, and it will be apparent that the piston 14 is vacuum-suspended and since pressures in motor chambers 70 and 71 will be balanced, the spring 16 will hold the piston 14 and the elements connected thereto in the off position shown. It will be apparent that the piston 20 is returned to normal position after a releasing of the brakes by the spring 29. Movement of the piston 20 is limited by engagement of the cylindrical extension 24 with the snap ring 27. Movement of the plunger 30 is limited by its engagement with snap ring 34, the spring 33 urging the plunger 30 and piston 20 relatively apart, and thus opening passage 32. Accordingly, the valve 31 is normally open so that any leakage from the high pressure end of the system can be replenished from the reservoir 46. This replenishment takes place through pipe 42, passage 40, low pressure cylinder chamber 26, ports 25 and passage 32.

Inasmuch as atmospheric pressure is always present in pipe 91 due to the connection of this pipe to the atmosphere through passages 90, 85 and 82, atmospheric pressure is always present above the check valve 100. Since the chamber 70 is normally connected to the source of vacuum, vacuum normally will be established in the pumping chamber 98 through pipe 101. Accordingly, the diaphragm 95 will be in its lower position shown, air being admitted to chamber 97 past check valve 100 and the spring 96 being compressed until it balances differential pressures in the chambers 97 and 98.

When the operator desires to apply the brakes, he will depress the brake pedal 45 to displace fluid from the master cylinder through pipe 42 into the low pressure chamber 26. From this chamber, brake fluid flows through ports 25, passage 32, chamber 23 and pipe lines 110 into the brake cylinders 111 to move the brake shoes into engagement with the brake drums. This movement takes place relatively freely, and thereafter static pressure will be built up in the high pressure end of the system.

After the brake shoes engage the drums, further displacement of fluid into the chamber 26 results in the flow of fluid through passage 84 into the bottom of the cylinder 83, thus resulting in effecting upward movement of the plunger 64. This plunger carries with it the diaphragm 60 and plate 62, the latter being brought into engagement with the valve 66 upon initial movement of the plate 62. Thus communication will be cut off between chambers 53 and 61, and consequently between the motor chambers 70 and 71. Slightly further upward movement of the plunger 64 causes the plate 62 to elevate the valve 66, thus lifting the valve 54 from its seat and connecting the atmospheric chamber 52 to the chamber 53 to admit air into the motor chamber 70.

Since the chamber 71 remains in constant communication with the intake manifold, the admission of air into the chamber 70 will cause the piston 14 to move to the right to close the valve 31 and disconnect the chambers 26 and 23, whereupon movement of the motor piston 14 will be transmitted to the piston 20, assisted by the manually generated pressure in the chamber 26. Thus pressure will be built up in the high pressure end of the brake system to apply the brakes.

The booster mechanism just described, including its control valve mechanism, form no part per se of the present invention and is well-known in the art. It will be clearly understood that brake application will depend upon the manual pressure generated by the foot of the operator, such manual pressure determining the functioning and follow-up control characteristics of the valve mechanism. High pressure generated in the chamber 23 will always result in some leakage of fluid past the seal 21, thus slightly increasing the volume of fluid in the chamber 26, passage 84 and the lower end of the plunger cylinder 83. This leakage for a given brake application will not be sufficient to noticeably affect the positioning of the valves which control the booster motor. Leakage past the lower end of the valve operating plunger 64 will find its way into chamber 81. This chamber being opened to the atmosphere, the leakage finding its way thereinto will flow by gravity through passage 85 to the chamber 36 where it joins the fluid leaking slightly from the chamber 26 past the seal 35. Atmospheric pressure obviously also will be present in the chamber 36 whereby the leakage fluid is free to flow downwardly by gravity through passage 90 and pipe 91 except as controlled by the check valve 100.

When the brakes are applied in the manner referred to, the increase in pressure in the chamber 70 communicates itself to the chamber 98 through pipe 101, and the increase in pressure in the chamber 98 will result in upward movement of the diaphragm 95. This increases pressure in the chamber 97 and seats the valve 100 while unseating the valve 104. If sufficient hydraulic fluid is present in the chamber 97, such fluid will be forced past the check valve 104 through line 102 back to the reservoir 46.

When the brake pedal is released, pressure will immediately drop in the chamber 26 and the valve mechanism for the motor 10 will return to the normal position shown, vacuum being reestablished in the motor chamber 70 whereby the spring 16 will return the piston 14 to its normal "off" position. As the parts approach normal position, the valve 31 will open to reestablish the normal communication between chambers 26 and 23.

The reestablishment of vacuum in the motor chamber 70 similarly affects the chamber 98, the diaphragm 95 thereupon moving downwardly and reducing pressure in the chamber 97 slightly below that of the atmosphere to open the check valve 100. Leakage fluid thus will flow from the pipe 91 into the chamber 97 to be forced therefrom back into the reservoir 46 upon the next application of the brakes.

From the foregoing, it will be apparent that the present mechanism provides means for collecting any fluid which may leak past the lower end of the valve operating plunger 64, below the seal 80, and any fluid which may leak past the seal 35. The leakage fluid thus collected is automatically returned to the reservoir 46 to prevent the loss of the hydraulic fluid from the system. The pump 92 is fully automatic in operation and requires no attention on the part of the operator. The pressure responsive member of the pump, namely the diaphragm 95, moves in one direction upon a brake application and in the opposite direction upon releasing of the brakes. Each complete operation and releasing of the brakes thus results in two movements of the diaphragm 95, one of such movements intaking fluid and the other displacing the fluid back to the reservoir 46. The pump 92 is very simple in construction and is composed of a minimum number of parts, thus providing dependability in operation.

It will be obvious that the specific pump 92 described is subject to variation, it merely being necessary that this pump depend for its functioning on the completion of one normal cycle of operation of the brake system for each complete cycle of operation of the pump. The operation of the pump may depend on a mechanical connection with the booster mechanism, or the fluid pressure connection may be varied in any desired manner so long as the pump functions in cooperation with and interdependence upon the functioning of the booster mechanism, to return leakage fluid to the reservoir. Without the present mechanism, there would be two points of leakage present, namely, past the plunger 64 into the chamber 61, and past the seals 35 and 37 into the motor chamber 71.

Sooner or later, such leakage fluid, as has been found in actual practice, finds its way into the intake manifold and thence into the vehicle engine to be burned and exhausted with the burned gases. Accordingly, there was a constant even if slow loss of hydraulic fluid which resulted sooner or later in the exhaustion of the supply of fluid in the reservoir. Unless the quantity of brake fluid in the reservoir was checked every few days, it was inevitable that a brake failure would occur from the loss of brake fluid long before such failure would have occurred through the normal loss of fluid which always takes place without the use of a booster mechanism. The present system operates to collect and return to the reservoir all fluid leaking in the manner described, and accordingly the loss of fluid is reduced to the point where it equals the normal loss occurring in hydraulic brake systems not provided with the present mechanism.

I claim:

1. A hydraulic mechanism comprising a hydraulic cylinder, a piston in said cylinder movable toward one end thereof to generate pressure therein, a fluid pressure operated motor connected to said piston and energizable for moving said piston toward said end of said cylinder, and a fluid pressure operated pump having fluid pressure connection with said motor to be simultaneously operated therewith in accordance with differential pressures therein for collecting leakage fluid from the other end of said cylinder.

2. A hydraulic mechanism comprising a hydraulic cylinder, a piston in said cylinder movable toward one end thereof to generate pressure therein, a fluid pressure operated motor connected to said piston and energizable for moving said piston toward said end of said cylinder, and a fluid pressure operated pump having a pressure movable member dividing it into a pair of chambers one of which directly communicates with the interior of said motor to be subjected to pressure variations therein to be simultaneously operated thereby, the other chamber of said pump having restricted communication with the other end of said cylinder to withdraw hydraulic fluid leaking therefrom.

3. A hydraulic mechanism comprising a hydraulic cylinder, a piston in said cylinder movable toward one end thereof to generate pressure therein, a fluid pressure operated motor connected to said piston and energizable for moving said piston toward said end of said cylinder, and a fluid pressure operated pump having a pressure movable member dividing it into a pair of chambers one of which directly communicates with the interior of said motor to be subjected to pressure variations therein to be simultaneously operated thereby, an inlet pipe for the other chamber of said pump having restricted communication with the other end of said cylinder to collect hydraulic fluid leaking therefrom, a check valve in said inlet pipe opening toward said other chamber of said pump, and a check-valved outlet for said other chamber of said pump.

4. A hydraulic mechanism comprising a hydraulic cylinder, a piston in said cylinder movable toward one end thereof to generate pressure therein, a fluid pressure operated motor connected to said piston and energizable for moving said piston toward said end of said cylinder, and a fluid pressure operated pump having a pressure movable member therein dividing it into a pair of chambers one of which is in fixed communication with said motor to be subjected to differential pressures therein, a spring in said pump urging said pressure movable member in a direction opposite to its direction of movement which occurs when said motor is energized, whereby the chambers of said pump are successively expanded when said motor is energized and then deenergized, and a duct communicating with the other chamber of said pump to supply thereto fluid leaking from the other end of said cylinder.

5. A hydraulic mechanism comprising a hydraulic cylinder, a piston in said cylinder movable toward one end thereof to generate pressure therein, a fluid pressure operated motor connected to said piston and energizable for moving said piston toward said end of said cylinder, and a fluid pressure operated pump having a pressure movable member therein dividing it into a pair of chambers one of which is in fixed communication with said motor to be subject to differential pressures therein, a spring in said pump urging said pressure movable member in a direction opposite to its direction of movement which occurs when said motor is energized, whereby the chambers of said pump are respectively expanded when said motor is energized and then deenergized, and a duct communicating with the other chamber of said pump to supply thereto fluid leaking from the other end of said cylinder, a check valve in said duct opening toward said other chamber of said pump, and an outlet duct for the latter chamber having a check valve opening outwardly therefrom.

6. A hydraulic mechanism comprising a hydraulic cylinder, a piston in said cylinder movable toward one end thereof to generate pressure therein, a master cylinder communicating with the other end of said cylinder, a fluid pressure operated motor having mechanical connection with said piston and having a constant pressure chamber and a variable pressure chamber, a valve mechanism operable for increasing the pressure in said variable pressure chamber to move said piston toward said one end of said cylinder, a pressure responsive element connected to said valve mechanism, a chamber for said element communicating with said other end of said cylinder whereby said element is movable by fluid entering said other end of said cylinder to energize said motor, a fluid collecting chamber surrounding said element and into which fluid finds its way after leaking past said pressure responsive element, a fluid pressure operated pump having a pressure responsive member dividing it into a pair of chambers one of which communicates with the variable pressure chamber of said motor to move said pressure responsive member in one direction upon energization of said motor, means biasing said pressure responsive member in the other direction, and a duct connecting said fluid collecting chamber to the other chamber of said pump.

7. A hydraulic mechanism comprising a hydraulic cylinder, a piston in said cylinder movable toward one end thereof to generate pressure therein, a master cylinder communicating with the other end of said cylinder, a fluid pressure operated motor having mechanical connection with said piston and having a constant pressure chamber and a variable pressure chamber, a valve mechanism operable for increasing the pressure in said variable pressure chamber to move said piston toward said one end of said cylinder, a pressure responsive element connected to said valve mechanism, a chamber for said element communicating with said other end of said cylinder whereby said element is movable by fluid entering said other end of said cylinder to energize said motor, a fluid collection chamber surrounding said element and into which fluid finds its way after leaking past said pressure responsive element, a fluid pressure operated pump having a pressure responsive member dividing it into a pair of chambers one of which communicates with the variable pressure chamber of said motor to move said pressure responsive member in one direction upon energization of said motor, means biasing said pressure responsive member in the other direction, a duct connecting said fluid collecting chamber to the other chamber of said pump, a check valve in said duct opening toward said other chamber of said pump, and an outlet duct connected between said other chamber of said pump and the reservoir of the master cylinder and having a check valve therein opening away from the last-mentioned chamber.

8. Apparatus constructed in accordance with claim 7 wherein said fluid collecting chamber is above the chamber of said pressure responsive element and above the other end of said cylinder whereby pressure is required for the flow of fluid into said collecting chamber, the latter chamber being vented to the atmosphere and said other chamber of said pump being below said collecting chamber whereby hydraulic fluid tends to flow by gravity from said collecting chamber to said other chamber of said pump.

9. Apparatus constructed in accordance with claim 7 wherein the mechanical connection between the pressure responsive member of said motor and said piston comprises a piston rod, a seal in one end of said motor through which said piston rod extends, and a chamber surrounding said piston rod between said seal and said other end of said cylinder and forming a part of first-named duct.

10. A hydraulic booster brake mechanism comprising a master cylinder having a reservoir and brake cylinders operable by hydraulic pressure, a hydraulic cylinder having a piston therein dividing it into a low pressure end and a high pressure end, the latter of which communicates with said brake cylinders, the low pressure end of said hydraulic cylinder communicating with the master cylinder, a differential fluid pressure operated motor having a pressure responsive unit therein dividing it into a constant pressure chamber and a variable pressure chamber, a valve mechanism operable for increasing pressure in said variable pressure chamber to actuate said pressure responsive unit and move said piston toward said high pressure end of said hydraulic cylinder, a plunger connected to said valve mechanism and movable in one direction to increase pressure in said variable pressure chamber, a control cylinder in which said plunger operates, a duct connecting said control cylinder to the low pressure end of said hydraulic cylinder whereby said plunger is operable by hydraulic pressure in said low pressure end of the hydraulic cylinder, a fluid pressure operated pump having a pressure responsive member dividing it into a pair of chambers one of which communicates with the variable pressure chamber of said motor to move said member in one direction upon energization of said motor, means biasing said member for movement in the other direction, and inlet and outlet ducts connected to the other chamber of said pump and provided respectively with check valves opening inwardly and outwardly relative to such chamber, said inlet duct having leakage communication with said control cylinder.

11. Apparatus constructed in accordance with claim 10 wherein said outlet duct communicates with the reservoir of the master cylinder.

12. A hydraulic booster brake mechanism comprising a master cylinder having a reservoir and brake cylinders operable by hydraulic pressure, a hydraulic cylinder having a piston therein dividing it into a low pressure end and a high pressure end, the latter of which communicates with said brake cylinders, the low pressure end of said hydraulic cylinder communicating with the master cylinder, a differential fluid pressure operated motor having a pressure responsive unit therein dividing it into a constant pressure chamber and a variable pressure chamber, a valve mechanism operable for increasing pressure in said variable pressure chamber to actuate said pressure responsive unit and move said piston toward said high pressure end of said hydraulic cylinder, a plunger connected to said valve mechanism and movable in one direction to increase pressure in said variable pressure chamber, a control cylinder in which said plunger operates, a duct connecting said control cylinder to the low pressure end of said hydraulic cylinder whereby said plunger is operable by hydraulic pressure in said low pressure end of the hydraulic cylinder, a fluid pressure operated pump having a pressure responsive member dividing it into a pair of chambers one of which communicates with the variable pressure chamber of said motor to move said member in one direction upon energization of said motor, means biasing said member for movement in the other direction, inlet and outlet ducts connected to the other chamber of said pump and provided respectively with check valves opening inwardly and outwardly relative to such chamber, said control cylinder being arranged above said low pressure end of said hydraulic cylinder, and having a fluid collecting chamber surrounding said plunger above said control cylinder, said collecting chamber being vented to the atmosphere and said inlet duct communicating with said collecting chamber with said other chamber of said pump arranged below said collecting chamber for the flow of hydraulic fluid by gravity through said inlet duct.

13. Apparatus constructed in accordance with claim 12 wherein said outlet duct communicates with the reservoir of said master cylinder for the return thereto of fluid collecting in said other chamber of said pump.

14. Apparatus constructed in accordance with claim 12 wherein said motor is provided with a seal through which said piston rod extends, said inlet duct including a chamber surrounding said piston rod between said seal and the low pressure end of said hydraulic cylinder to collect hydraulic fluid leaking from the latter around said piston rod, said outlet duct communicating with the reservoir of the master cylinder.

JEANNOT G. INGRES.

No references cited.